Aug. 20, 1963   T. A. GARRITY, JR., ETAL   3,101,467
SEISMIC RECORD PICKER
Filed Dec. 19, 1958   3 Sheets-Sheet 1

INVENTORS
THOMAS A. GARRITY JR.
BY   RONALD R. PROCTOR

ATTORNEY

Aug. 20, 1963  T. A. GARRITY, JR., ETAL  3,101,467
SEISMIC RECORD PICKER
Filed Dec. 19, 1958  3 Sheets-Sheet 2

COINCIDENCE OR REFLECTION 130   FORM OF RECORD OBTAINED

FINAL RECORD FROM ONE STRIP

FINAL X-SECTION

INVENTORS
THOMAS A. GARRITY JR.
BY  RONALD R. PROCTOR

Edward K Jung
ATTORNEY

Aug. 20, 1963  T. A. GARRITY, JR., ET AL  3,101,467
SEISMIC RECORD PICKER
Filed Dec. 19, 1958  3 Sheets-Sheet 3

INVENTORS
THOMAS A. GARRITY JR.
BY  RONALD R. PROCTOR

ATTORNEY

3,101,467
SEISMIC RECORD PICKER

Thomas A. Garrity, Jr., Caracas, Venezuela, and Ronald R. Proctor, Crystal Lake, Ill., assignors to The Pure Oil Company, Chicago, Ill., a corporation of Ohio
Filed Dec. 19, 1958, Ser. No. 781,537
9 Claims. (Cl. 340—15.5)

This invention relates to method and apparatus for interpreting old seismographic records by translating the wave diagram into a solid line diagram showing the true dip of the rock formation.

In one method of exploration seismology a charge of explosives is detonated in a relatively shallow hole placed between rows of geophones which are placed at predetermined distances from the hole. The waves created by the explosion are reflected back from the earth and picked up by the geophones, amplified, filtered and recorded as traces on paper to produce what is commonly termed the seismic record.

Unfortunately, geophones detect noises as well as reflections and it is often difficult to detect or pick true reflections from the background of noise.

Figure 7:
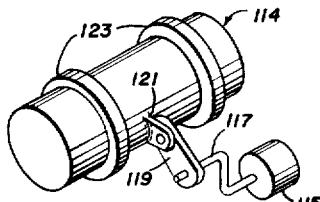
Figure 1:
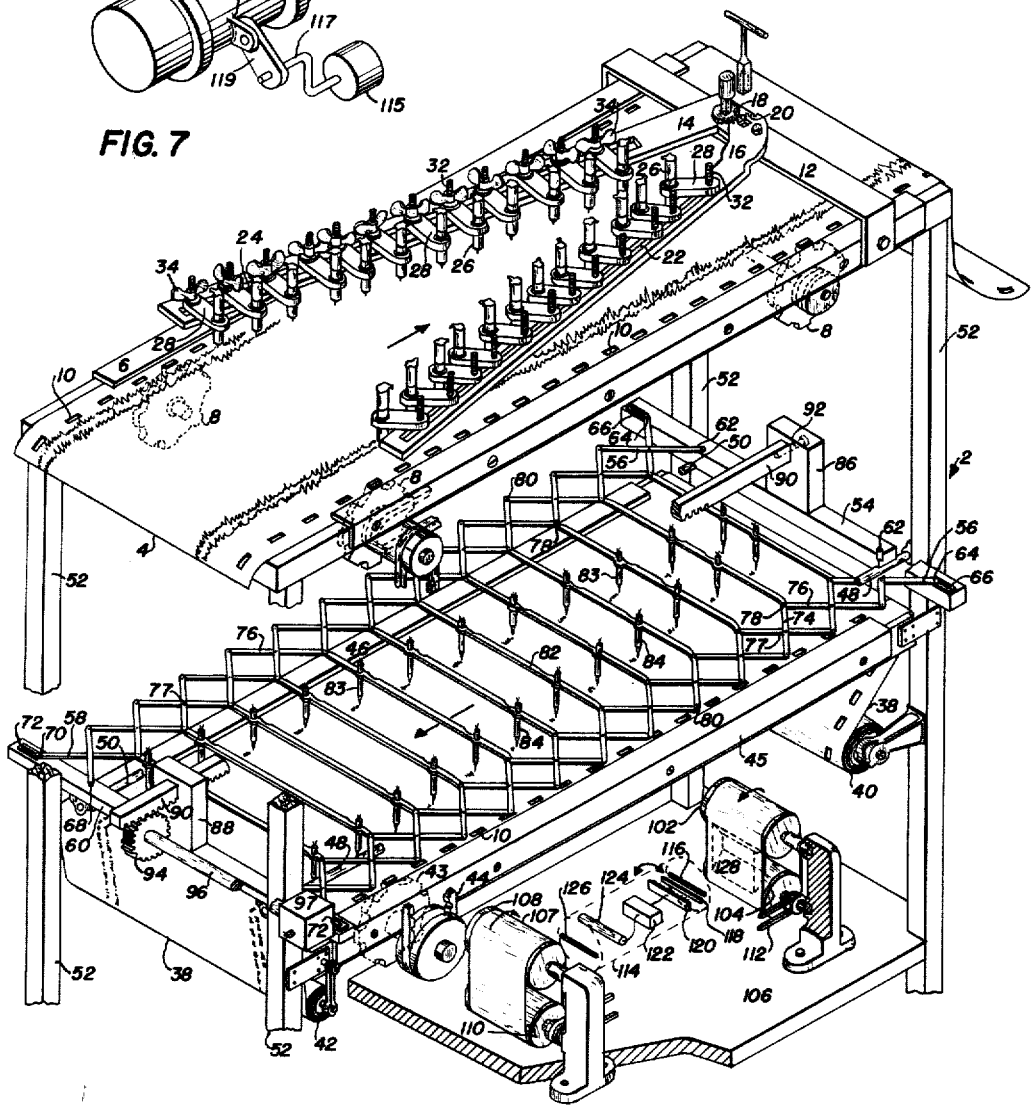
Figure 2:
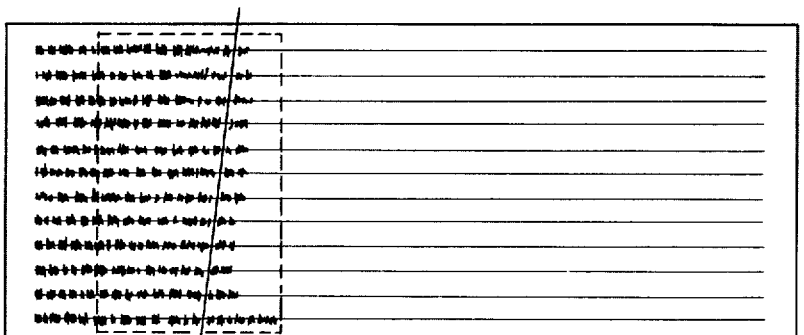
Figure 4:
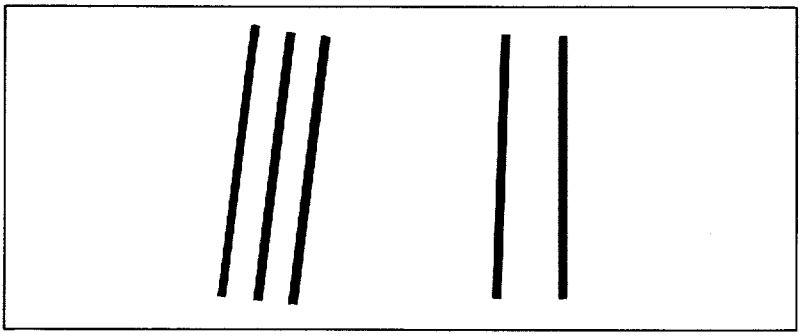
Figure 5:
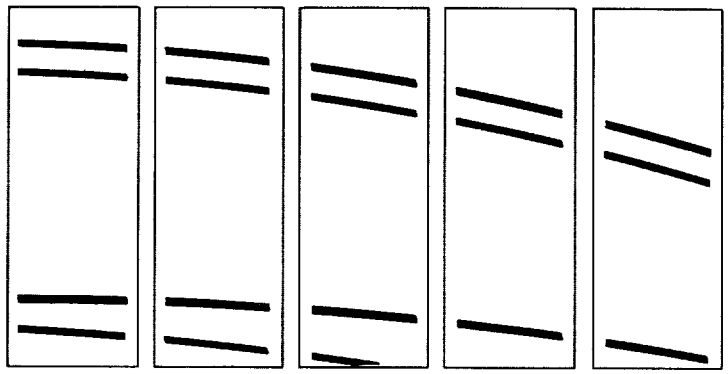
Figure 3:
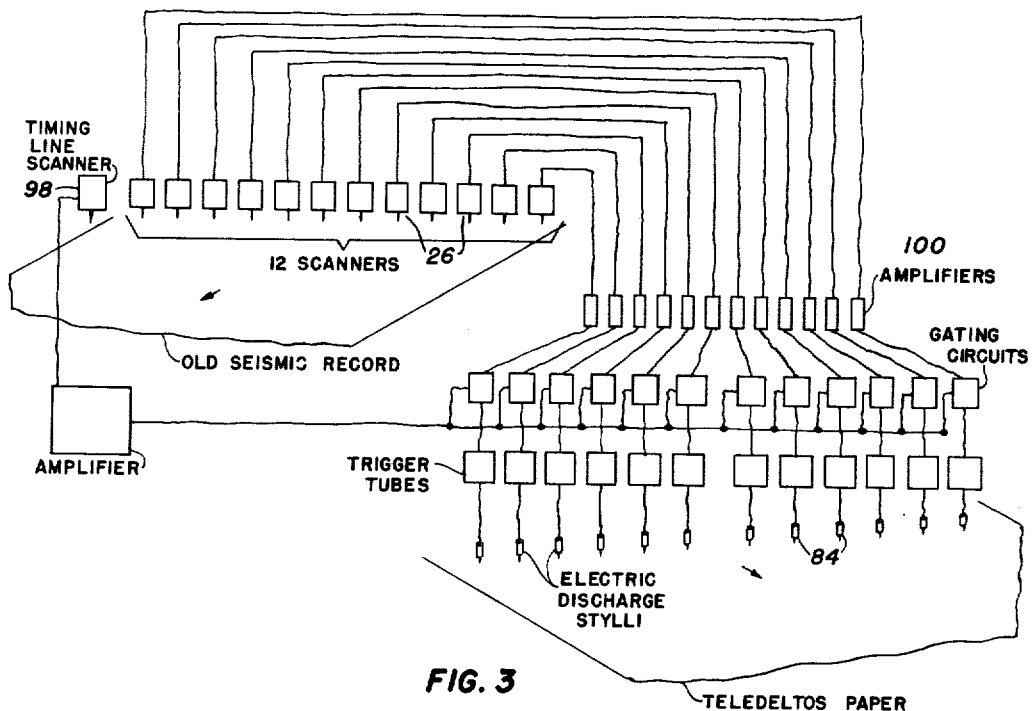
Figure 6:
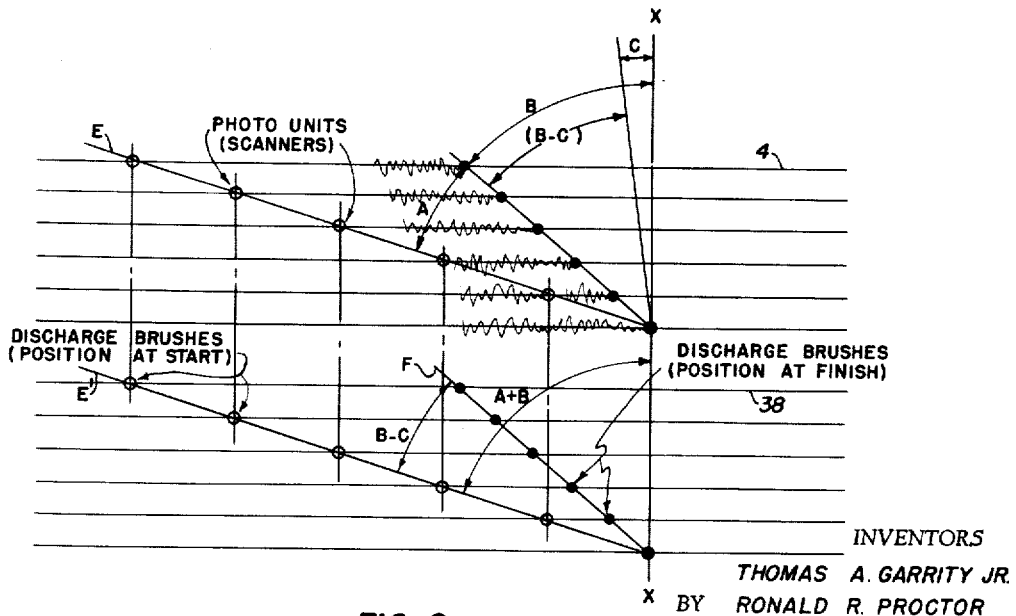

An object of this invention is to provide a method and apparatus for picking true reflections from seismic records. Another object of the invention is to provide a method and apparatus for translating information contained on seismic records into a graphic representation portraying the true dip of the rock formation from which reflections are recorded in the seismic record. A further object of the invention is to provide a method and apparatus for obtaining a true seismic cross-section of a geologic rock structure below the earth's surface from seismic records. Other objects of the invention will become apparent from the following description and drawings, or which FIGURE 1 is an isometric view of apparatus for picking old seismic records and for translating the picked record into a record showing the true dip of the rock formation recorded on the seismographic record; FIGURE 2 is a plan view of a portion of a picked record; FIGURE 3 is a diagrammatic view of the electrical elements forming a part of the device shown in FIGURE 1; FIGURE 4 is a plan view of the final record produced by the device shown in FIGURE 1; FIGURE 5 is a plan view showing the pictorial representation of a subsurface rock formation by laying side by side a plurality of records corresponding to that shown in FIGURE 4, FIGURE 6 is a graphical representation showing the correction for normal move out, and FIGURE 7 is an isometric view of a portion of the device shown in FIGURE 1.

Referring to the drawings, the photographic or seismic record is placed in a scanning mechanism shown in FIGURE 1. The scanning mechanism is composed of a framework 2 having an upper horizontal plate, not visible in the drawing, upon which the record 4 is placed. On each side of the framework, along the edges of the plate, are mounted longitudinal angles 6 which serve to hold the record against the plate. Mounted at the forward and rear ends of the framework are sprocket wheels 8 which are adapted to engage two rows of sprocket holes 10 punched adjacent the lateral edges of the record in order to pull the record through the scanner and guide it in a straight pah. The plate previously mentioned lies between the forward and rear sets of sprocket wheels and is of a width substantially equal to the distance beween the two rows of sprocket holes.

Pivotally mounted above the plate on cross-member 12 are arms 14 and 16. As shown in the drawing, the two arms are engaged by gear segments 18 and 20 so that they can be rotated in opposite directions at the same time. However, the arms may be separately rotatable so as to position them for the purpose hereinafter described.

The arms 14 and 16 are provided with elongated slots 22 and 24 to provide means for mounting thereon a plurality of spaced photoelectric or photoconductive cells 26, each having its own light source and being so arranged as to "see" contrasting lines or traces on the record. The arms are sufficiently long to enable the two arms to carry enough photocells to match the number of traces on the record and enable each cell to be adjusted to a position over the null position or base line of a separate trace. The cells 26 are mounted on short arms 28, which in turn are mounted on threaded rods 32, upon which are adapted to fit thumb screws 34. Upon loosening the thumb screws the arms 28 can be moved longitudinally in slots 22 or turned on rods 32. Upon tightening the screws the arms 28 and the photocells will be held in any desired position. By reason of the fact that the arms 14 and 16 are pivoted and each photocell is individually mounted on the arms in movable position, an individual photocell can be accurately aligned with the null position or base line of each trace on the seismographic record. The number of photocells will correspond to the number of traces on the record.

Suitable photoelectric or photoconductive cells which may be used for scanning the seismographic record are miniature type, such as are manufactured by Autotron, Inc. of Danville, Illinois, Ess Instrument Co. of Bergenfield, New Jersey, or Munro Electronic Associates of Mansfield, Mass.

Mounted on the frame directly below the first-mentioned plate is a second horizontal plate, not shown, which is adapted to support a sheet of electrically-sensitive paper, such as "Teledeltos" paper 18. The sheet of paper 38 is adapted to be moved in synchronism with the seismographic record 4 by means of rollers 40 and 42 and sprocket wheels 43. Sprocket wheels 8 and 43 rotate in definite ratio to one another by means of belt 44. Angle members 45 and 46 are fastened to the sides of the frame and extend over the lateral edges of the lower plate in order to hold the paper 38 against the plate as it travels through the scanning device.

Immediately above the plate which supports paper 38 are two rods 48 and 50 mounted on the uprights 52 of framework 2 and extending longitudinally from the front to the rear end of the framework. The rods 48 and 50 are shown broken for sake of simplicity. Slideably mounted crosswise on rods 48 and 50 is an arm 54. Fastened to the either end of arm 54 is a pantograph device 56, the forward ends 58 of which extend to the front end of the framework 52 and are pivotally fastened to cross arm 60. Cross arm 60 is rigidly mounted on the front uprights 52 in a horizontal plane. Each pantograph device 56 has a fixed pivot point 62 on arm 54 and a slideable pivot point 64 adapted to slide in recess 66 of arm 54. The forward end of each pantograph device likewise has a fixed pivot point 68 on arm 60 and a slideable pivot point 70 adapted to slide in recesses 72 in arm 60.

The pantographs 56 are made up of a series of arms 74 and 76, pivotally connected to each other at central pivots 77, inside pivot points 78 and outside pivot points 80. Arms 74 are parallel to each other as are also arms 76. Opposite inside pivot points 78 are connected to each other by rigid arms 82. On each arm 82 is mounted a pair of styli 83 and 84, each of which is connected to a photoelectric cell 26 immediately above it through a series of individual amplifiers, gating circuits and trigger tubes as shown in FIGURE 3. These styli are so connected as to discharge continuously unless cut off by a signal from a photocell circuit, thereby producing a series of parallel black marks on the sensitized paper. At each intersection of a trace with its baseline on the seismic record, as the record is pulled through the scanning device, an impulse or change in output of the photoelectric circuit occurs when this point passes below the photoelectric cell, thereby momentarily cutting off the electrical discharge through the corresponding stylus and producing a void or white mark on the sensitized paper 38.

As will be seen from FIGURE 1, the styli 83 and 84 on each arm 82 are spaced in order that each stylus can produce a separate trace.

Mounted centrally on arm 54 is block 86 and mounted centrally on arm 60 is guide block 88. A rack 90 fastened by means of screw 92 or other suitable means to block 86 extends through a cutout in block 88 and engages pinion 94, keyed to shaft 96 which is in turn rotatably mounted at the forward end of the framework 2. Shaft 96 may be geared to rotate at a definite ratio with the shaft upon which sprocket 43 is mounted, or it may be independently rotated by a synchronized motor 97 in timed relation with the travel of paper 38.

Before the record is scanned, the record is inspected and appropriate calculations are made to correct for the uneven heterogeneous earth, commonly called the "pattern." These corrections are made by positioning arms 14 and 16 to pre-calculated angle and by sliding and/or rotating the arms 28 the required amount so that the photoelectric scanners maintain proper alignment with their respective traces.

In addition to correcting for "pattern," correction must also be made for "normal moveout" before the record is scanned and picked. The angle of normal moveout from the beginning to the end of the record is determined. Shaft 96 is then fixed to rotate at such speed as to cause the angle, which a line drawn through each bank of styli 83 and 84 will make with the direction of travel of paper 38, to change to correct for normal moveout during the running of the record. This correction is more fully explained by reference to FIGURE 6. The record 4 starts in the direction shown by the arrow with the geophone traces starting at different times. A line through the starting points makes an angle B with the reference line X—X. By the time the end of the record is reached, representing the maximum depth from which reflections are received by the geophones, the reflections arrive at the geophones in such relation as to form angle C with respect to reference line X—X. Thus, the angle of reflection has decreased by an amount B minus C. Because of the physical limitations of size, it is necessary to position the scanning photoelectric cells 26 at an additional angle A to the baseline X—X for a total angle of A plus B so that the photoelectric cells will lie along line E. The styli or discharge brushes 83 and 84 are similarly positioned along line E' at an angle of A plus B at the start of the record by proper positioning of the arm 54. To correct for the normal moveout, the angle assumed by the lines along which the two sets of styli 83 and 84 lie must be reduced by the amount B minus C from beginning to the end of the record so that the styli will line up along line F at the end of the record. This is accomplished by causing shaft 96 to rotate at a predetermined speed ratio with respect to the rotation of paper drive sprocket 43 such that the action of the pinion 94 on the rack 90 will cause the arm 54 to move forward in such a manner as to realign the styli 83 and 84 along lines corresponding to angle A plus C to base line X—X at the end of the record.

It will be apparent from FIGURE 1 that because of the arrangement of the pantograph structure, styli 83 and 84 cannot move laterally but only in a longitudinal direction.

At the time the record is inspected to make the necessary correction factors, the sprocket holes are punched adjacent the edges by any suitable punching mechanism.

After the scanner has been properly set to correct for the pattern and the pantograph drive mechanism adjusted to correct for normal moveout, the motor which drives the sprocket wheels is started and the seismographic record is scanned and the scanned record transposed to the "Teledeltos" paper.

The record obtained on the "Teledeltos" paper will correspond to that shown in FIGURE 2. Each seismic ray path or trace will produce on the "Teledeltos" paper an interrupted series of black lines, the interruptions indicating the points at which the trace crosses the baseline.

The point at which each timing line on the seismographic record crosses each baseline will also produce an impulse and a consequent void mark on the "Teledeltos" paper. This impulse can be gated out of the signal from each photocell by providing a separate photocell 98 similar to those used for scanning the traces to pick up each of the timing marks and using the signals thus generated to actuate an electronic gate, the action of which is familiar to those versed in the art, in the trace scanner amplifiers 100 (FIGURE 3) so that the photocells scanning the timing line do not cut off their respective styli for each timing line. This may occasionally cause the loss of a trace mark if the timing line happens to be coincident with a point where the trace crosses the baseline. Likewise, the line of a trace which has been over-modulated will occasionally be picked up by the adjacent trace scanner, creating a spurious signal, but these occasional lost or spurious signals do not seriously interfere with the usefulness of the picked record.

The seismographic record and the "Teledeltos" paper are run in opposite directions and although they may be run through the scanner at the same speed, it is preferred to adjust the speed of the "Teledeltos" paper so that it travels at about one-third to one-half the speed of the seismographic record in order to obtain a smaller record for the next operation. This provides a picked record with closely spaced markings on the secondary record which are about 1/16″ in width, and simplifies the subsequent steps which are to be performed in converting the picked record into a formation cross-section. Markings of desired width can be readily obtained by using chisel point or brush-type discharge electrodes in conjunction with "Teledeltos" paper, or by the use of glow discharge tubes in conjunction with photographic film.

The secondary or picked record composed of a series of parallel lines of interrrupted markings is made into a continuous loop or "belt" and placed on a set of two rolls 102 and 104, mounted either on another frame, or, as shown in this embodiment, mounted on the base 106 of framework 2 (FIGURE 1), and enclosed by a light-tight box (not shown). Roll 102 may be driven by means of a belt or other mechanism to rotate the rolls at relatively high speed.

Light-sensitive paper loop or "belt" 107 is wrapped around another set of rolls 108 and 110 synchronized to rotate at the same speed as rolls 102 and 104 by means of notched timing belt 112 or other suitable positive-drive means. Located between the two sets of rolls is an elongated tube 114, having at one end an elongated slit 116 and housing an optical system 118, a row of sulfide photoconductive cells 120, amplifier 122 and glow discharge tube 124. At the other end of the tube 114 is slit 126. The aforesaid elements are all arranged in tube 114 whose axis of rotation is on a line perpendicular to both the surface of the picked record and the surface of the light-sensitive paper. Light source 128 is placed between rolls 102 and 104 so that it shines through the picked record on the rolls in the direction of elongated tube 114. The tube 114 is adapted to be slowly oscillated through 45° in either direction about its axis by any suitable mechanism such as a motor 115, crank 117 and connecting rod 119 pivotally connected to bracket 121 mounted on the wall of tube 114. The tube oscillates in collars 123. If a series of voids or spaces in the separate rows of interrupted marks become coincident along a straight line, as for example, along line 130 (FIGURE 2), when slit 116 is at the same angle, the light passes through slit 116, actuating the cells 120 to an extent sufficient to light up the glow discharge tube 124, the light from which in turn passes through slit 126 and is photographed on the sensitive film. The threshold of tube 124 can be adjusted so as to light up when any given number of spaces become coincident along a straight line coincident with the angle of slit 116, as for example, when ten out of twelve possible spaces become coincident along a straight line. Electronic "coincidence" circuits, of types known to those versed in the art, may also be used to perform this function.

It will be apparent that the picked record must move rapidly with respect to the speed at which tube 114 oscillates so that a coincident series of spaces at any expected angle of dip can be picked up. As a general rule, coincidence of spaces will occur along straight lines at angles of plus or minus 45° from a line at right angles to the direction of travel of the record. Thus, if the picked record is travelling at a speed of 200 r.p.m. while the tube is turning through a 90° angle between these limits at a speed of 1 r.p.m., in one minute the tube will detect coincident lines of spaces at less than ½° increments.

The final record obtained on the sensitive film will appear as shown in FIGURE 4. Each line represents the true dip of a rock formation indicated below the earth's surface by the seismographic record. By taking a plurality of seismographic records obtained on adjacent areas and placing them side by side, a true seismic cross-section of the geological rock structure below the earth's surface can be portrayed, as illustrated in FIGURE 5.

We claim as our invention:

1. In a device for translating seismographic wave data into formation cross-sectional data, the elements comprising means for moving a strip of paper along a straight path, a plurality of electrically-actuated elements supported in spaced relationship opposite said path, means for supporting said elements including a pair of pantographs the corresponding ends of which are fixed to prevent longitudinal movement thereof and the other corresponding ends of which are fastened to an element movable longitudinally of said path, a series of rigid rods mounted between opposite pivot points of said pantographs, said electrically-actuated elements being mounted on said rods.

2. In a device for translating seismographic wave data into formation cross-section data, the elements comprising means for longitudinally moving a strip of paper in a straight path, a plurality of light-sensitive cells mounted at spaced points opposite said path, means for individually adjusting said cells in directions both longitudinal of and transverse to said path, said last-mentioned means comprising a plurality of short arms on each of which is mounted a light-sensitive cell, each of said short arms being mounted on an elongated arm, one end of which is pivoted and the other end of which is free, in such manner that the short arms can be rotated about a point on the arm spaced from the light-sensitive cell mounted thereon and can be moved longitudinally along said elongated arm, means for moving a second strip of paper in a second straight path at a speed correlated with the speed of said first-mentioned strip, a plurality of spaced electrically-actuated elements mounted opposite said second path, each of said elements being electrically connected to a separate light-sensitive cell, means for supporting said elements against lateral movement and means for progressively changing the longitudinal position of said elements in timed relation with the speed of said means for longitudinally moving said first-mentioned strip.

3. In a device for translating seismographic wave data into formation cross-section data, the elements comprising means for longitudinally moving a strip of paper in a straight path, a plurality of light-sensitive cells mounted at spaced points opposite said path, means for individually adjusting said cells in directions both longitudinal of and transverse to said path, means for moving a second strip of paper in a second straight path at a speed correlated with the speed of said first-mentioned strip, a plurality of spaced electrically-actuated elements mounted opposite said second path, each of said elements being electrically connected to a separate light-sensitive cell, means for supporting said elements against lateral movement and means for progressively changing the longitudinal position of said elements in timed relation with the speed of said means for longitudinally moving said first-mentioned strip, said next to last-mentioned means comprising a pair of pantographs, the forward ends of which are fixed to prevent forward movement and the rear ends of which are fastened to a rack actuated by a pinion, means for rotating said pinion in fixed timed relation to the means for moving said first-mentioned paper strip, a series of rigid rods mounted between opposite pivot points of said pantographs, said electrically actuated elements being mounted on said rods.

4. A device in accordance with claim 3 in which said electrically actuated elements are electrical discharge styli.

5. In a device for translating seismographic wave data into formation cross-section data, the elements comprising means for longitudinally moving a strip of paper in a straight path, a plurality of light-sensitive cells mounted at spaced points opposite said path, means for individually adjusting said cells in directions both longitudinal of and transverse to said path, means for moving a second strip of paper in a second straight path at a speed correlated with the speed of said first-mentioned strip, a plurality of spaced electrically-actuated elements mounted opposite said second path, each of said elements being electrically connected to a separate light-sensitive cell, means for supporting said elements against lateral movement, means for progressively changing the longitudinal position of said elements in timed relation with the speed of said means for longitudinally moving said first-mentioned strip, means for rapidly and repeatedly passing said second-mentioned strip of paper in front of a narrow slit, means for lighting said sheet, an intermittent light source activated by the light pattern received through said slit, a second slit in alignment with said first slit, said intermittent light source being located between and in line with said slits, means for rapidly and repeatedly passing a third strip of paper across said second slit on the side opposite said intermittent light source and means for slowly rotating said slits in unison on an axis passing through said slits.

6. A device in accordance with claim 5 in which said slits are formed in the opposite ends of a closed, opaque, elongated, hollow body, said intermittent light source is mounted in said body and said body is mounted to rotate around its longitudinal axis.

7. The method of translating a seismographic record, containing a plurality of traces representing sound waves which repeatedly cross straight base lines, into a graphic representation of the true dip of subterranean rock formations, comprising translating said seismographic record into a plurality of parallel intermittent lines corrected for pattern and normal movement, each of which lines has intermittent blank spaces which represent the points of intersection of a trace with the base line, and tracing a straight line corresponding to an imaginary line intersecting said intermittent lines, along a path determined by the blank spaces on adjacent intermittent lines, lying along said imaginary intersecting line.

8. Method in accordance with claim 7 in which a straight is traced through only those blank spaces in said intermittent lines occurring along an imaginary straight line drawn at an angle of about 45 to 90° to said parallel intermittent lines.

9. In a device for translating seismographic wave data into formation cross-sectional data, the elements comprising means for rapidly and repeatedly passing a picked seismographic wave record sheet in front of a narrow slit, means for lighting said sheet, an intermittent light-sensitive element activated by the light pattern received through said slit, a second slit in alignment with said first slit, said intermittent light-sensitive element being located between said slits and in alignment therewith, means for rapidly and repeatedly passing a sheet sensitive to said light-sensitive element across said second slit on the side opposite said intermittent light-sensitive element, and means for slowly rotating said slits in unison about an axis passing through said slits.

References Cited in the file of this patent

UNITED STATES PATENTS

| | | |
|---|---|---|
| 2,243,730 | Ellis | May 27, 1941 |
| 2,604,955 | Hawkins | July 29, 1952 |
| 2,810,898 | Meiners | Oct. 22, 1957 |
| 2,861,507 | Palmer | Nov. 25, 1958 |
| 2,875,017 | Reynolds | Feb. 24, 1959 |
| 2,924,810 | Horeth | Feb. 9, 1960 |

UNITED STATES PATENT OFFICE
CERTIFICATE OF CORRECTION

Patent No. 3,101,467                                  August 20, 1963

Thomas A. Garrity, Jr., et al.

It is hereby certified that error appears in the above numbered patent requiring correction and that the said Letters Patent should read as corrected below.

Column 1, line 36, for "or" read -- of --; line 64, for "pah" read -- path --; column 6, line 71, after "straight" insert -- line --.

Signed and sealed this 3rd day of March 1964.

(SEAL)
Attest:
ERNEST W. SWIDER
Attesting Officer

EDWIN L. REYNOLDS
Acting Commissioner of Patents